UNITED STATES PATENT OFFICE.

WILLIAM A. GOVERN, OF NORWALK, CONNECTICUT.

IMPROVED PROCESS OF REMOVING BURRS AND OTHER SUBSTANCES FROM WOOL.

Specification forming part of Letters Patent No. 70,085, dated October 22, 1867.

*To all whom it may concern:*

Be it known that I, WILLIAM A. GOVERN, of Norwalk, in the State of Connecticut, have invented a new and Improved Process of Treating Wool for the Removal of Burrs and other Vegetable Matter therefrom; and I do hereby declare that the following is a full and exact description thereof.

Much of the wool used by manufacturers contains a vegetable product known as "burrs" entangled in the fibers of the wool, which burrs are so numerous and firmly embedded as to render their removal by hand impracticable, and are of so tough and tenacious a quality that they cannot be thoroughly removed in their natural state by mechanical means, without great injury to the fiber or staple of the wool; and with the most complete mechanical precautions which are practicable more or less portions of the burrs will cling to the wool, and appear in the manufactured fabric in the form of "specks," as they are technically called. The quality of the goods is thus materially injured, and in many instances of colored manufactures the presence of these specks renders a second dyeing, called "speck-dyeing," necessary, inasmuch as the dye-stuffs applied will not produce the same resulting color in the specks as in the wool, the one being a vegetable and the other an animal product. It also becomes necessary, in many cases, to employ operatives to examine the cloth and remove any adhering portions of burrs. Other vegetable products occur in the wool, but are less troublesome than the tenacious burrs already described; and my process is intended to apply to the removal of any such injurious and clinging vegetable matter which may be entangled in the unwrought wool, the term "burr" being hereinafter intended to include all such foreign vegetable matter.

Many mechanical devices, called "burring-machines," have been applied to the removal of such burrs, but with imperfect success; and some chemical processes have also been employed for the same purpose, but generally with injury to the strength of the fiber. The nature of my invention is chemical; and consists in saturating the wool and burrs therein contained in certain solutions for the purpose of rendering the burrs so brittle and friable that they crumble and break in pieces when subjected to the action of any efficient willowing or burring machine. My process does not therefore in itself remove the burrs from the wool as a solvent or destroyer of the burr; but it deprives the burr of its toughness and tenacity, so that it is easily pulverized or broken up, and falls out of the wool in the cleaning machinery in the form of dust and small fragments, leaving the wool entirely clean of vegetable fibers, while at the same time its staple is uninjured and even improved by the liquids applied to it.

The preparation of the liquids which I employ and the application of my said process are as follows:

In forty gallons of water I dissolve eighteen (18) pounds of Peruvian guano and twenty pounds of soda-ash. The strength of this solution, as given, is suitable for application to most foreign wool, while some American wool will require a stronger solution. In such solution I immerse about fifteen hundred pounds of the wool containing burrs, and allow it to remain until entirely saturated, it being generally ready for removal in one-half hour or less. In a tank (near at hand to facilitate the shifting of the wool) I make a solution of about fifty pounds of common salt in eight hundred gallons of water, with which are mixed three quarts, by bulk, of muriatic acid of common commercial strength. The saturated wool above mentioned is then removed from the first-named solution into the second, which I denominate the "brine," and there remains about four hours. The period of immersion in the brine will, however, vary somewhat with the class of wool operated upon, and can only be accurately determined by reference to the nature and amount of the vegetable matter to be removed and the use to which the wool is to be applied, the period of four hours being the average time of immersion in the brine. The average strength of the brine will be about 10° of a common alkali-hydrometer. After a sufficient immersion in the brine, the wool is removed and allowed to dry, when it can be passed through the "willow" and the burring-machine, and is then ready for the carding-machine or the dye-house. When dried, the burrs will be found to have lost the property of clinging to the wool, and to be readily broken up and dislodged from the wool. The solution first named can be used for the treatment of several successive quantities of wool by adding, after each use, sufficient quantity of water to maintain the same bulk of solution, and also sufficient soda-ash and guano to maintain the requisite strength.

I have hereinbefore assigned certain definite quantities of the ingredients to be used in the first-named solution and in the brine; but the quality and quantity of vegetable matter in different wools vary so greatly, as also do the uses to which the cleansed wool is applied, that I am unable to confine myself to the precise quantities of the several ingredients as here given, as the same can be found accurately determined for each case by reference only to the condition of the wool itself and the burrs therein, and by reference to the principles of my process, which are as follows: I employ guano, as containing a large amount of ammonia in a beneficial form, viz., a urate of ammonia; and as being both cheap and readily obtainable, I have employed the excrement of various animals in solution for the same purpose, and also the ammonia of commerce, but prefer to employ guano. To speedily discharge the ammonia contained in the guano, I employ soda-ash, as being an alkali which is usually at hand in a woolen-manufactory. I do not, therefore, confine myself to the use of the one form of alkali named, as any other alkali for effecting the same purpose might be employed. The purpose of applying the solution of guano and soda-ash is to retain the softness and pliability of the wool, or, in other words, to act as a protection for this wool while immersed in the brine, while incidentally it also whitens and softens it, as the ammonia acts as a solvent of the animal and vegetable oils contained in the wool. The effect of the brine is to act upon the burr and destroy its tenacity and toughness. The use of a solution of guano, or some equivalent containing ammonia and alkali, combined with the use of muriatic acid and salt in solution for the purposes named, I believe to be new.

I am aware that sulphuric acid has been used to act upon the burrs in wool; but its use imparts a dark shade to the wool, and is therefore objectionable. By my process both the quality and color of the wool are improved to a marked degree, and, if applied after the wool is scoured, the wool is so thoroughly cleansed of inward grease by the solution of the guano and the alkali that it submits readily to the subsequent operation of fulling and cleansing when felted or woven into cloth, and a saving of about fifty per cent. of fulling-soap is made over the ordinary process.

What I therefore claim as my invention, and desire to secure by Letters Patent, is—

Treating wool for the removal of burrs and other vegetable matter therefrom by the process substantially as herein described and set forth.

WM. A. GOVERN.

Witnesses:
J. P. BUCKLAND,
W. H. SPENCER.